United States Patent [19]
Fujikura et al.

[11] Patent Number: 5,825,161
[45] Date of Patent: Oct. 20, 1998

[54] BATTERY PACK AND CHARGING DEVICE

[75] Inventors: Toshiaki Fujikura; Hidekazu Nakama, both of Chiba, Japan

[73] Assignee: Uniden Corporation, Tokyo, Japan

[21] Appl. No.: 764,284

[22] Filed: Dec. 12, 1996

[30] Foreign Application Priority Data

Oct. 1, 1996 [JP] Japan .................................. 8-260429

[51] Int. Cl.$^6$ .................................................. H01M 10/44
[52] U.S. Cl. ........................................ 320/162; 320/112
[58] Field of Search .............................. 320/2, 5, 22, 21, 320/27, 30, 39, 162, 112, 128, 101, 104, 26, 29

[56] References Cited

U.S. PATENT DOCUMENTS

| | | | |
|---|---|---|---|
| 5,111,128 | 5/1992 | Branan, Jr. et al. | 320/2 |
| 5,164,652 | 11/1992 | Johnson et al. | 320/2 |
| 5,191,277 | 3/1993 | Ishikura et al. | 320/22 |
| 5,332,957 | 7/1994 | Lee | 320/2 |
| 5,371,453 | 12/1994 | Fernandez | 320/5 |
| 5,576,610 | 11/1996 | Patino et al. | 320/31 |
| 5,608,306 | 3/1997 | Rybeck et al. | 320/15 |
| 5,627,449 | 5/1997 | Fujiki | 320/5 |

FOREIGN PATENT DOCUMENTS

| | | |
|---|---|---|
| 2-307336 | 12/1990 | Japan . |
| 2-307337 | 12/1990 | Japan . |
| 4-229027 | 8/1992 | Japan . |
| 5-160774 | 6/1993 | Japan . |
| 5-160775 | 6/1993 | Japan . |
| 6-319230 | 11/1994 | Japan . |

Primary Examiner—Peter S. Wong
Assistant Examiner—Gregory J. Toatley, Jr.
Attorney, Agent, or Firm—McDermott, Will & Emery

[57] ABSTRACT

When a reference potential is loaded to a pair of lead wires connected via a resistor having a resistance value corresponding to a specified battery capacity, a partial potential is obtained through a serial circuit comprising the resistor above, a diode, and another resistor, and a collector current for transistors is adjusted according to a relation between the partial potential and the resistor. As a result, a current value of the charging current supplied from a charger to a battery pack is controlled, and a charging operation for a charging time allocated by a microcomputer to standard charging or fast charging is insured.

8 Claims, 2 Drawing Sheets

BATTERY PACK AND CHARGING DEVICE

FIELD OF THE INVENTION

The present invention relates to a battery pack and a charging device, and more particularly to a battery pack having a chargeable and dischargeable battery and a charging device for charging battery packs each having a different battery capacity.

BACKGROUND OF THE INVENTION

A resistor with a resistance value corresponding to a battery capacity is generally provided in an internal circuit of this type of battery pack. When it is charged, the resistor of the battery pack is electrically coupled to a microcomputer (described as MC hereinafter) of the charging device, so that the MC recognizes a battery capacity of the battery pack.

Namely, the MC identifies a battery capacity of the battery pack according to a voltage difference between both edges of the resister in the battery pack, and a charging current corresponding to the recognized battery capacity is supplied to the battery of the battery pack, whereby charge control is executed.

It should be noted that a similar technology is disclosed in, for instance, in Japanese Patent Laid-Open Publication No. HEI 5-160774. Disclosed in this publication is a technology for obtaining information concerning a type of battery fetched with a resistor provided in the battery pack in a case where a charging current is controlled according to a type of battery pack.

However, the charging device according to the example based on the conventional technology described above has the configuration in which an MC recognizes a battery capacity of a battery pack, so that the MC cannot determine an appropriate current value if it cannot determine a battery capacity. For this reason, the charging device cannot start a charging operation.

SUMMARY OF THE INVENTION

It is an object of the present invention to provide a battery pack and a charging device which are chargeable according to an appropriate current value without any MC therebetween.

With the battery pack according to the present invention, in a case where a reference potential is applied to the pair of lead wires for charge control connected to each other via the resistor having a resistance value corresponding to the specified battery capacity, the battery pack obtains a partial potential corresponding to the resistance value of the resistor and controls a current value of charging current supplied from the charger according to the partial potential, so that the current value is controlled to provide a charging current corresponding to the battery capacity without requiring interference by a microcomputer. As a result, the battery pack can execute charging according to an appropriate current value without requiring interference by a microcomputer.

With the charging device according to the present invention, the charging device comprises the battery pack removably set in the charger, supplies the reference potential to the pair of lead wires for charge control connected to each other via the resistor having a resistance value corresponding to the specified battery capacity, obtains a partial potential corresponding to the resistance value of the resistor, and controls a current value of charging current supplied from the charger to the battery pack according to the partial potential; whereby the current value is controlled to provide a charging current corresponding to the battery capacity between the charger without having a microcomputer therein and the battery pack. As a result the charging device can execute charging according to an appropriate current value without a microcomputer.

With the charging device according to the present invention, the charger selects a required reference potential among a plurality of different reference potentials previously set in correspondence to a plurality of different charging modes; the auxiliary charger removably set in the battery pack detects a voltage value according to the reference potential loaded to either one of the pair of lead wires for charge control, and controls a charging operation of the charger according to a charging mode corresponding to the detected voltage value, so that it is not necessary to incorporate a microcomputer in the charger and with this feature configuration of the charger is simplified, which enables reduction of cost for the entire device.

With the charging device according to the present invention, the auxiliary charger controls a charging time suited to the fast charging mode or the standard charging mode; whereby the charger without having a microcomputer therein can provide controls for fast charging or standard charging, and as a result, structure of the charger is simplified, which makes it possible to lower the cost of the entire charging device.

With the charging device according to the present invention, an auxiliary charger is provided in electronic equipment such as a portable telephone set, so that it is not necessary to identify a battery capacity and it is required only to provide controls over fast charging or standard charging according to a reference potential loaded from the charger.

Other objects and features of this invention will become understood from the following description with reference to the accompanying drawings.

DESCRIPTION OF THE PREFERRED EMBODIMENTS

Detailed description is made hereinafter for one of preferred embodiments of the present invention with reference to the related drawings.

Figure 1:
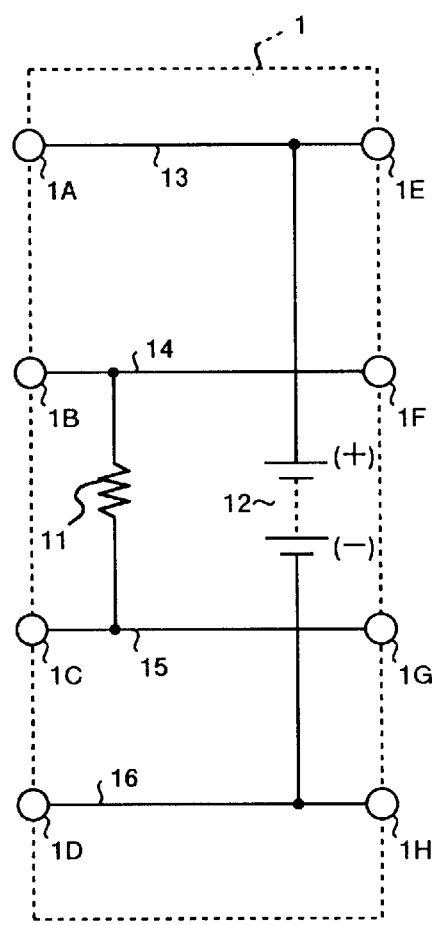
FIG. 1 is a circuit diagram showing a battery pack according to a preferred embodiment of the present invention.

At first, description is made for the battery pack according to the present invention. FIG. 1 is a circuit diagram showing a battery pack according to one of the embodiments of the present invention, and in the figure, the reference numeral 1 indicates a battery pack. The battery pack 1 is detachably attached to a charger, not shown herein, supplied with power from a commercial power source, and is charged with a reference potential and a charging current from the charger.

The battery pack 1 comprises, as shown in FIG. 1, a chargeable and dischargeable battery 12 having a specified battery capacity; a pair of lead wires for charge 13, 16 coupled to each other with the battery 12 therebetween; a resistor 11 with a resistance value given thereto according to the specified battery capacity of the battery 12; and a pair of lead wires for charge control 14, 15 coupled to each other with the resistor 11 therebetween.

The battery pack 1 has terminals for charge 1A, 1D each provided at one edge of the lead wires for charge 13, 16 thereof to be electrically connected to the charger which is not shown herein, and also has terminals for discharge 1E, 1H each provided at the other edges of the lead wires for charge 13, 16 to be electrically connected to electronic equipment which is not shown herein.

Also, the battery pack 1 has terminals for charge control 1B, 1C each provided at one of edges of the lead wires for charge control 14, 15 thereof to be electrically connected to the charger which is not shown herein, and also has terminals for charge control 1F, 1G each provided at one of the other edge of the lead wires for charge control 14, 15 to be electrically connected to electronic equipment which is not shown herein.

As for the operations, in this battery pack 1, in a case where the charger, not shown herein, supplies a reference potential to the lead wire for charge control 14, the lead wire for charge control 15 obtains a partial potential corresponding to a resistance value of the resistor 11, and the partial potential is given to the charger, whereby a current value of the charging current supplied from the charger is controlled.

Figure 2:
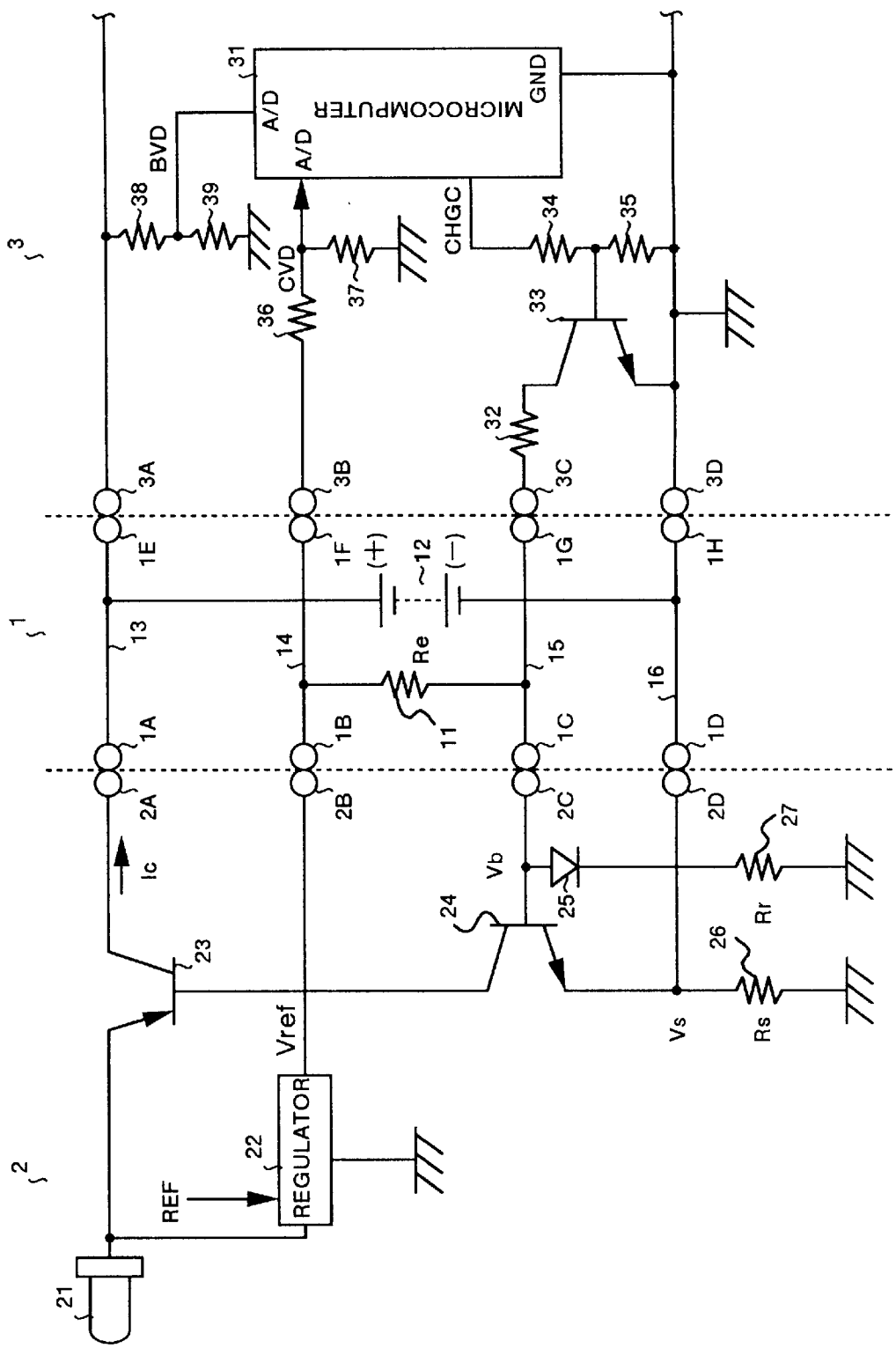
FIG. 2 is a circuit diagram of a charging device according to the preferred embodiment of the present invention.

Next, a description is made for the charging device according to the present invention. FIG. 2 is a circuit diagram showing a charging device according to one of embodiments of the present invention. The charging device shown in FIG. 2 comprises the battery pack 1, a charger 2 for charge control of this battery pack 1, and electronic equipment 3 such as portable telephone set or the like.

The charger 2 has terminals 2A, 2D, 2B, and 2C for being electrically connected to the terminals for charge 1A, 1D as well as to the terminals for charge control 1B, 1C of the battery pack 1 respectively.

Provided in the charger 2 is a plug 21 for connecting to a commercial power source (DC power source). An output terminal of the plug 21 is coupled to a regulator 22 as well as to a PNP type transistor 23 (to the emitter side). The regulator 22 generates a reference potential Vref according to commercial power supplied through the plug 21, and supplies the reference potential Vref to the terminal 2B.

A charging mode includes a standard charging mode and a fast charging mode. The charging mode is manually selected with the regulator 22, while the standard charging mode and the fast charging mode are set according to a signal REF supplied to the regulator 22.

The base of the transistor 23 is coupled to the collector of an NPN type transistor 24, and the collector of the transistor 23 is coupled to the terminal 2A. The transistor 23 supplies a charging current according to a commercial power to the terminal 2A when the transistor 24 is turned ON.

The base of the transistor 24 is coupled to the terminal 2C, and the emitter thereof is coupled to a resistor 26 having one electrode grounded. A series circuit comprising a diode 25 and a resistor 27 having one electrode grounded is connected to a node between the base of the transistor 24 and the terminal 2C, through an electrode of the diode 25.

This series circuit divides a reference potential Vref generated from the resistor 11 of the battery pack 1 as well as from the regulator 22, loads the partial potential Vb to the base of the transistor 24, whereby the transistor 24 is turned ON.

The transistor 24 adjusts a charging current supplied from the transistor 23 with a voltage Vs provided by the resistor 26 according to the partial potential Vb applied to the base of the transistor 24, and controls a current value of a charging current Ic supplied to the terminal 2A from the collector of the transistor 23.

The electronic equipment 3 comprises terminals 3A, 3D, 3B, and 3C each for being electrically connected to each of terminals for discharge 1E, 1H of the battery pack 1 as well as to each of terminals for charge control 1F, 1G thereof respectively.

Mounted in the electronic equipment 3 is a MC 31 incorporating therein a protecting timer for measuring a charging time. This MC 31 detects a battery voltage detection signal BVD according to a current value of a charging current having been controlled through resistors 38 and 39 each coupled to the terminal 3A, and also detects a control voltage detection signal CVD according to a reference potential Vref through resistors 36 and 37 each coupled to the terminal 3B.

Resistors 32, 34, 35 and an NPN type transistor 33 are coupled to each other between the MC 31 and the terminal 3C. The MC 31 identifies whether the charging mode is the fast charging mode or a standard charging mode according to the detected control voltage detection signal CVD, and supplies a charge-ON/OFF control signal CHGC to the terminal 3C in the ON state for only a charging time corresponding to each of the charging modes at a timing specified by a user. It should be noted that the charge-ON/OFF control signal CHGC is turned OFF after the charging time is over.

Next, a description is made for operations. In the charging device shown in FIG. 2, when the reference potential Vref is applied to the pair of lead wires for charge control 14, 15 coupled to each other with the resistor 11 having a resistance value corresponding to a specified battery capacity therebetween, a partial potential Vb is obtained according to a series circuit comprising the resistor 11, the diode 25, and the resistor 27, and a collector current between the transistors 24 and 23 is adjusted according to a relation between the partial potential Vb and a voltage Vs in the side of the resistor 26.

As a result, a current value of a charging current supplied from the charger 2 to the battery pack 1 is controlled, so that charging operation for the charging time allocated to a standard charge or to a fast charge by the MC 31 can be insured.

A trickle charge is executed by PWM control for turning ON or OFF the charge-ON/OFF control signal CHGC. In a case where the fast charging mode (charged by IC) is detected, the charging device controls a CHGC terminal with a duty factor set to 1/25, while, in a case where the standard charging mode (0.2 C charging) is detected, the device controls the CHGC terminal with the duty factor by 1/5, which enables an average current to work as a trickle charging current.

As described above, with the embodiment, a current value is controlled so that a charging current corresponding to a battery capacity between the charger 2 without the MC 31 therein and the battery pack 1 is provided, which makes it possible to charge a battery according to an appropriate current value without requiring the MC 31 therein. In this case, a charging current is decided by the resistor 11 in the battery pack 1, so that it is not required to prepare a plurality of protecting timers according to types of battery capacity. For this reason, one unit of protecting timer is sufficient for the device.

The charger 2 switches a voltage to a reference potential corresponding to a standard charge or to a fast charge by the regulator 22, and the electronic equipment 3 detects a voltage value according to a reference potential Vref loaded to the lead wire for charge control 14 and controls charging operation of the charger 2 according to either of the charging modes (a fast charge/a standard charge) corresponding to the detected voltage value, so that a MC is not required to be incorporated in the charger 2, whereby configuration of the charger 2 can be simplified, which makes it possible to reduce costs of the entire device.

Also, the electronic equipment 3 controls a charging time suitable to a fast charge or to a standard charge, so that a fast charge or standard charge of the charger 2 can be controlled without incorporating a MC in the charger 2, whereby the configuration of the charger 2 can be simplified, which makes it possible to reduce costs of the whole device.

The MC 31 functioning as an auxiliary charger is provided in the electronic equipment 3 such as a portable telephone set or the like, so that the electronic equipment 3 has such merits that it does not necessarily recognize a battery capacity of the battery pack 1 and only controls a fast charge or a standard charge of the charger 2 according to a reference potential Vref loaded from the charger 2.

As described above, with the battery pack according to the present invention, in a case where a reference potential is loaded to a pair of lead wires for charging control connected to each other via a resistor having a resistance value corresponding to a specified battery capacity, a battery pack obtains a partial potential corresponding to the resistance value of the resistor and controls a current value of charging current supplied from a charger according to the partial potential; whereby the current value is controlled to obtain a charging current corresponding to the battery capacity without interference by a microcomputer, so that it is possible to obtain a battery pack that executes charging according to an appropriate current value without requiring interference by a microcomputer.

With the charging device according to the present invention, a charging device comprises the battery pack removably set in the charger, loads the reference potential to the pair of lead wires for charging control connected to each other via the resistor having a resistance value corresponding to the specified battery capacity, obtains a partial potential corresponding to the resistance value of the resistor, and controls a current value of charging current supplied from the charger to the battery pack according to the partial potential, whereby the current value is controlled to obtain a charging current corresponding to the battery capacity between the charger without having a microcomputer therein and the battery pack, so that it is possible to obtain a charging device that executes charging according to an appropriate current value without requiring interference by a microcomputer.

With the charging device according to the present invention, the charger selects a required reference potential from among a plurality of different reference potentials previously prepared in correspondence to a plurality of different charging modes; the auxiliary charger removably set in the battery pack detects a voltage value according to the reference potential loaded to either one of the pair of lead wires for charging control, and controls a charging operation of the charger according to a charging mode corresponding to the detected voltage value, whereby the charger need not to be equipped with a microcomputer, so that structure of the charger is simplified, which makes it possible to provide a charging device enabling reduction of cost for the entire device.

With the charging device according to the present invention, the auxiliary charger controls a charging time suited to the rapid charging mode or the standard charging mode; whereby the charger without having a microcomputer therein can control the fast charging and the standard charging of the charger, so that structure of the charger is simplified, and it is possible to provide a charging device enabling reduction of cost for the entire device.

With the charging device according to the present invention, the auxiliary charger is provided in any electronic equipment such as a portable telephone set; whereby it is possible to obtain a charging device in which the electronic equipment is not required to discriminate a battery capacity of the battery pack and only controls the fast charging and the standard charging of the charger according to the reference potential loaded from the charger.

This application is based on Japanese patent application No. HEI 8-260429 filed in the Japanese Patent Office on Oct. 1, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A battery pack removably set in a charger supplied by a power from a commercial power source and receiving a reference potential and a charging current from said charger to execute a charging operation, comprising:

a chargeable/dischargeable battery having a specified battery capacity;

a pair of lead wires for charging connected to each other via said battery;

a resistor having a resistance value corresponding to said specified battery capacity; and a pair of lead wires for charge control connected to each other via said resistor, the lead wires for charging being different from the lead wires for charge control, wherein, in a case where said reference potential is applied from said charger to either one of said pair of lead wires for charge control, a current value of a charging current supplied from said charger is controlled according to a partial potential corresponding to the resistance value of said resistor.

2. A charging device comprising a charger receiving a power supply from a commercial power source to provide charge control, and a battery pack removably set in said charger for receiving a supply of a charging current from said charger to execute charging; wherein said battery pack comprises:

a chargeable/dischargeable battery having a specified battery capacity;

a pair of lead wires for charging connected to each other via said battery;

a resistor with a resistance value corresponding to said specified battery capacity given thereto; and a pair of lead wires for charge control connected to each other via said resistor;

wherein said charger comprises:

a supply means for a charging current based on a power supplied from said commercial power source to said pair of lead wires for charging; and a charging current controlling means for supplying a reference potential to either one of said pair of lead wires for charge control, and for controlling a current value of a charging current supplied from said supply means according to a partial potential corresponding to a resistance value of said resistor.

3. A charging device comprising a charger for receiving a power supply from a commercial power source, a battery pack for receiving a supply of a charging current from said charger to execute charging, and an auxiliary charger removably set in said battery pack and operating when receiving a supply of a current charged in said battery pack; wherein said battery pack comprises:

a chargeable/dischargeable battery having a specified battery capacity;

a pair of lead wires for charging connected to each other via said battery;

a resistor with a resistance value corresponding to said specified battery capacity given thereto; and a pair of lead wires for charge control connected to each other via said resistor;

wherein said charger comprises:

a supply means for a charging current based on a power supplied from said commercial power source to said pair of lead wires for charging; and a charging current controlling means for loading the reference potential to either one of said pair of lead wires for charge control and also controlling a current value of a charging current supplied from said supply means according to a partial potential corresponding to a resistance value of said resistor; and a selecting means for selecting a required reference potential from among a plurality of different reference potentials previously prepared in correspondence to a plurality of different charging modes; and wherein said auxiliary charger comprises:

a detecting means for detecting a voltage value according to the selected reference potential loaded to either one of said pair of lead wires for charge control and selected by said selecting means; and a controlling means for controlling a charging operation of said charger according to a charging mode corresponding to a voltage value detected by said detecting means among said plurality of different charging mode.

4. A charging device according to claim 3; wherein said plurality of charging modes include a fast charging mode and a standard charging mode, and said controlling means controls a charging time suited to said fast charging mode or said standard charging mode.

5. A charging device according to claim 3; wherein said auxiliary charger is provided in any electronic equipment such as a portable telephone set.

6. A method for charging a chargeable/dischargeable battery in accordance with a capacity of the battery, comprising:

providing a resistor having a resistance value corresponding to the capacity of the battery;

applying a variable reference potential to a series circuit including said resistor;

obtaining a partial potential corresponding to the resistance value of the resistor; and controlling a current value of charging current supplied from a charger to the battery according to the partial potential.

7. The method of claim 6, wherein said reference voltage is generated by a voltage regulator in said charger, and said step of applying a variable reference voltage includes the steps of:

selectively applying a first signal to the reference voltage generator for providing a reference voltage representing a standard charging mode, and selectively applying a second signal to the reference voltage generator for providing a reference voltage representing a fast charging mode.

8. The method of claim 6, wherein said step of controlling the current value includes the step of:

controlling the current value of charging current supplied from the charger without using a microcomputer.

* * * * *